United States Patent [19]

Caiello

[11] 4,159,349

[45] Jun. 26, 1979

[54] PIZZA PIE AND PIE MAKING METHODS

[76] Inventor: Joseph A. Caiello, 21 W. Las Flores, Arcadia, Calif. 91006

[21] Appl. No.: 847,199

[22] Filed: Oct. 31, 1977

Related U.S. Application Data

[63] Continuation-in-part of Ser. No. 740,288, Nov. 9, 1976, abandoned.

[51] Int. Cl.$^2$ ............................................. A21D 13/00
[52] U.S. Cl. ....................................... 426/94; 426/95; 426/100; 426/293; 426/296; 426/305; 426/808
[58] Field of Search .................... 426/94, 95, 100, 289, 426/290, 291, 293, 296, 19, 808, 92, 306, 305

[56] References Cited

U.S. PATENT DOCUMENTS 3,648,596  3/1972  Zito ........................................ 426/94

OTHER PUBLICATIONS

Woman's Day Encyclopedia of Cookery, vol. 10, Fawcett Pub. Inc., New York, p. 1604, 1966.

*Primary Examiner*—Jeanette M. Hunter
*Attorney, Agent, or Firm*—Benoit Law Corporation

[57] ABSTRACT

A cheese topping for a pizza pie comprises up to four geometrically congruent slices of pizza pie topping cheese. Each of these slices is dimensioned to extend from the center of the pie into the peripheral region of the pie shell and to extend along a portion of that peripheral region corresponding to the length of that peripheral region divided by the number of the up to four slices. The slices are further dimensioned jointly to cover the food items on the pizza shell and extend along and into its peripheral region in one layer composed of the slices when contiguously arranged on the food items. Each of slices is provided with several apertures through which vapor and juice can rise from the food items on the pizza shell. The apertured slices are contiguously arranged on the food items to form the mentioned one layer covering the food items and extending into the peripheral region of the pie shell.

75 Claims, 33 Drawing Figures

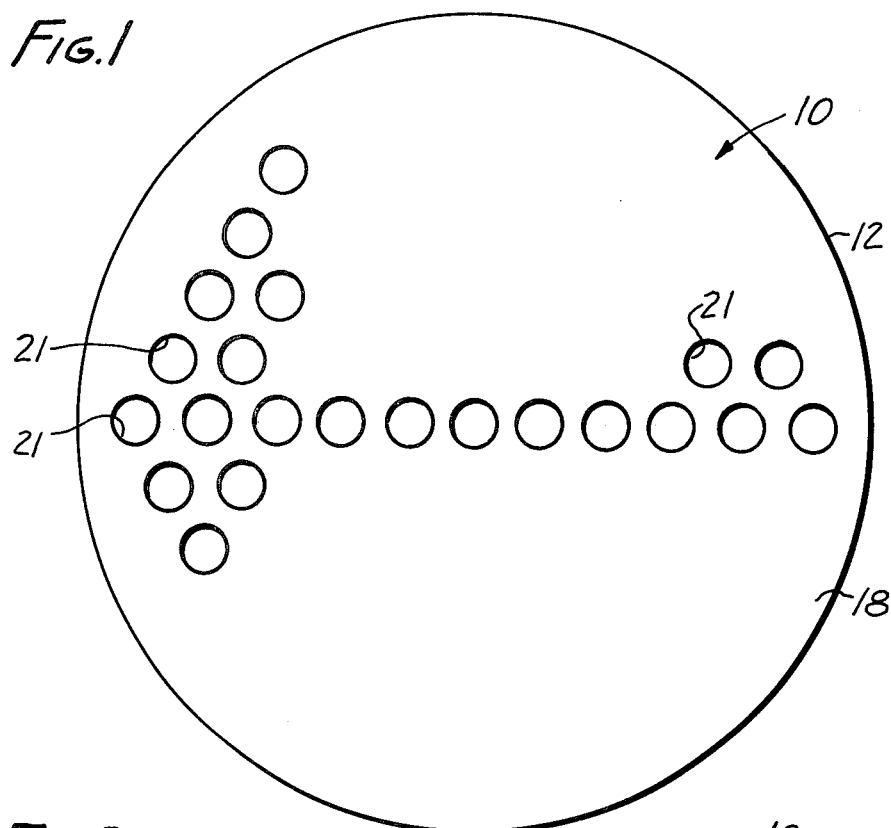
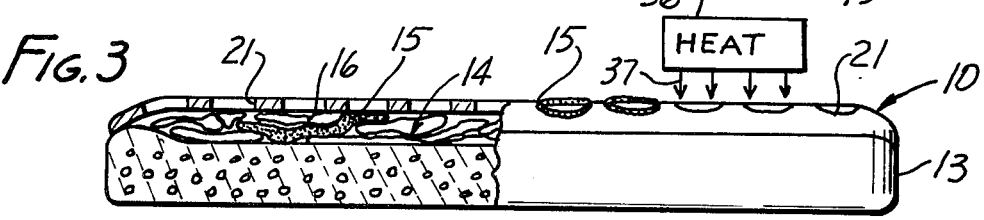
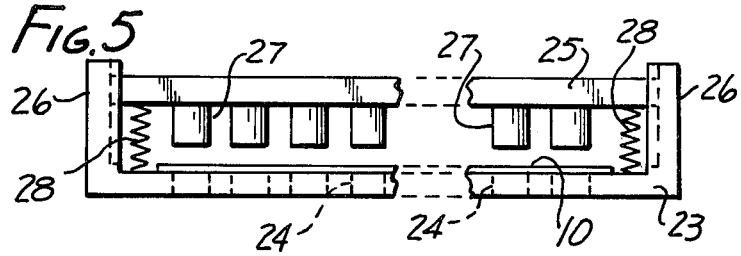
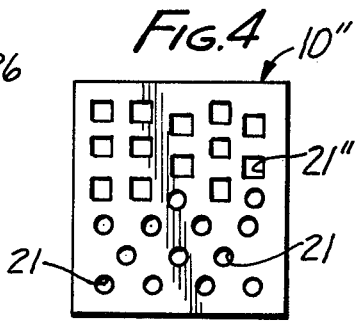
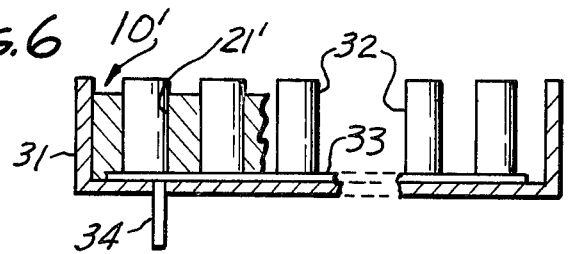

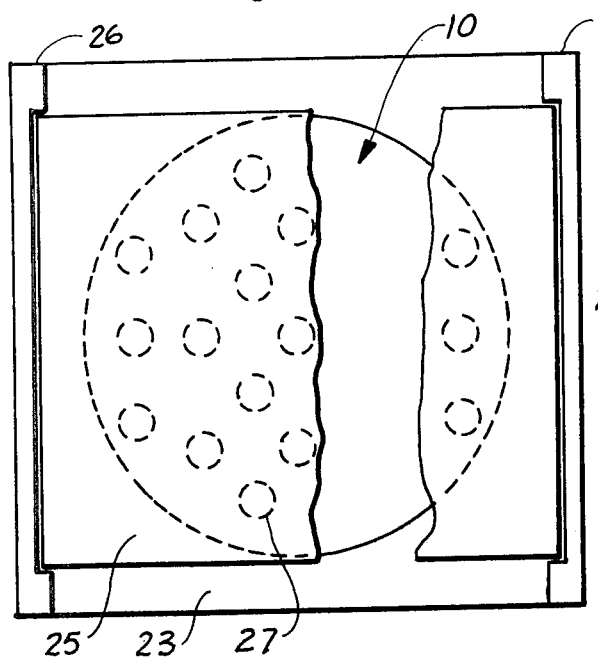
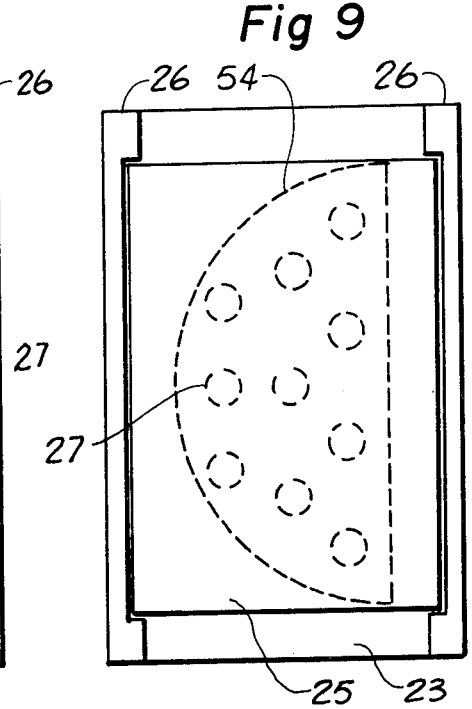
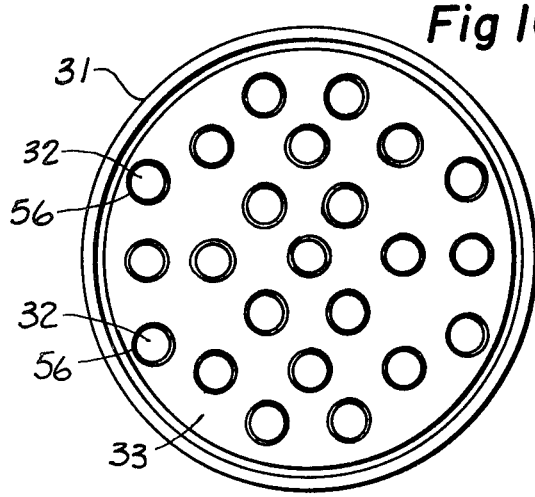
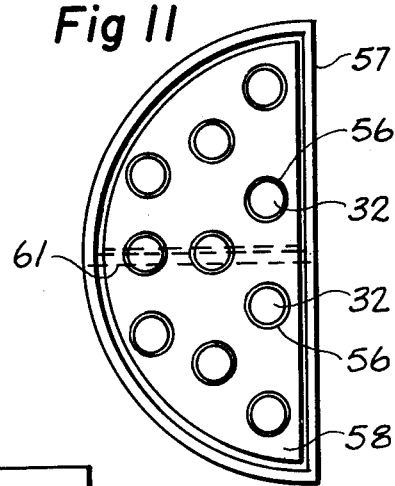
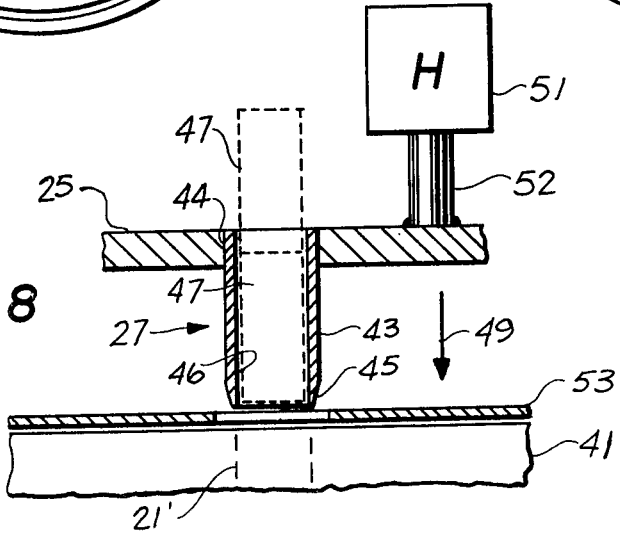

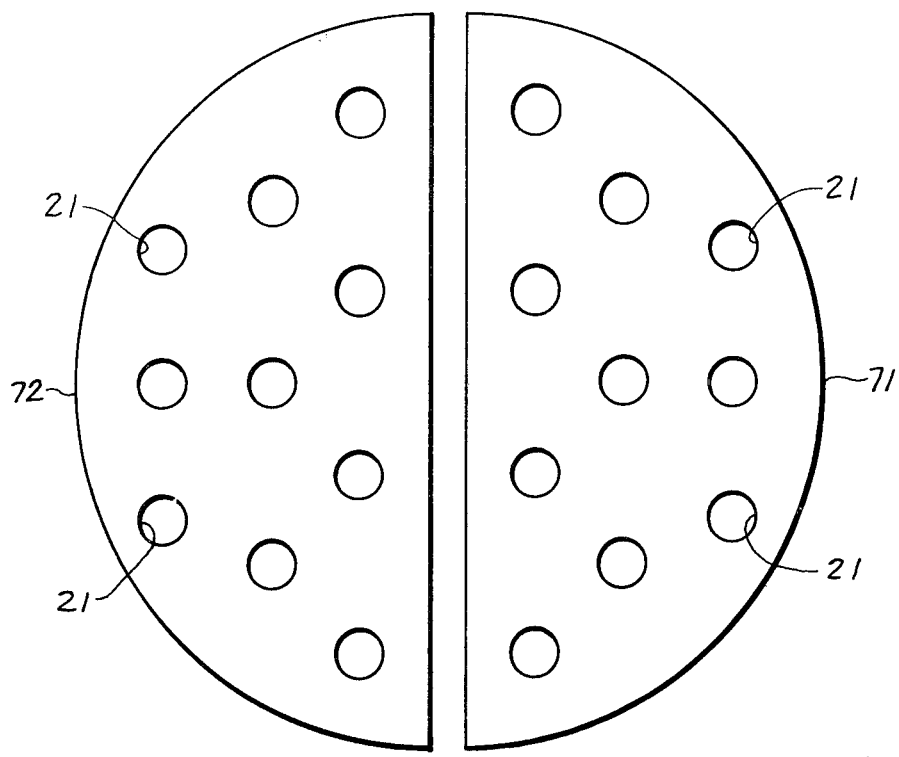
Fig 13
Fig 14
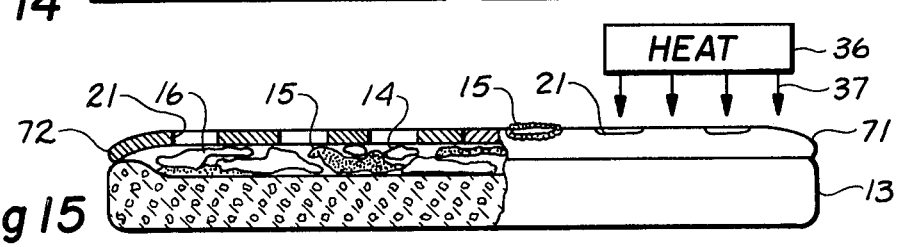
Fig 15
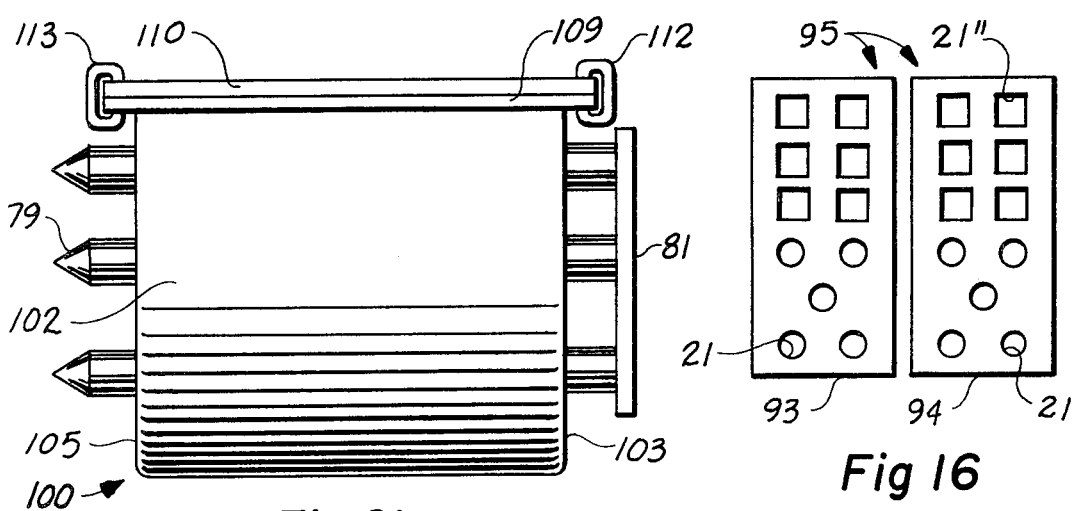
Fig 21
Fig 16

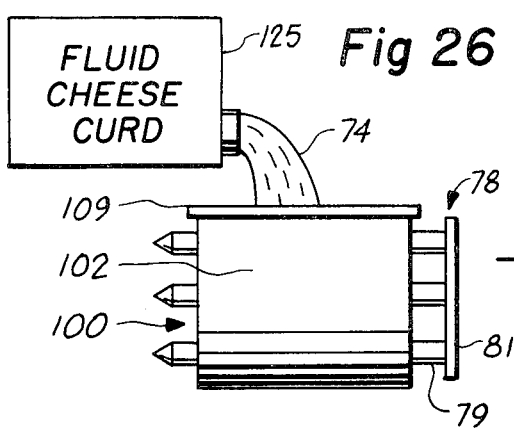
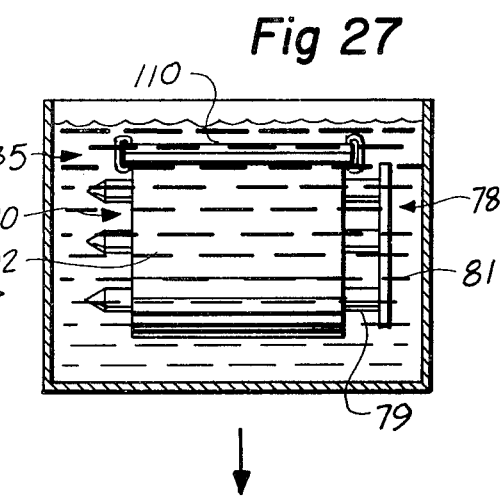
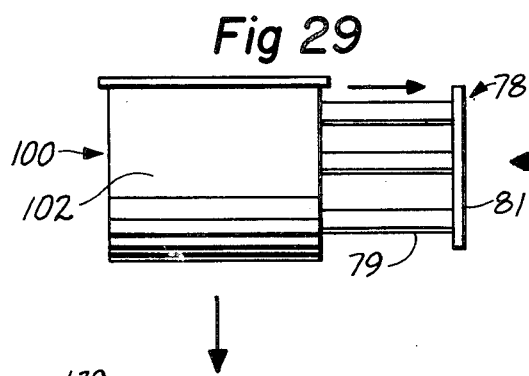
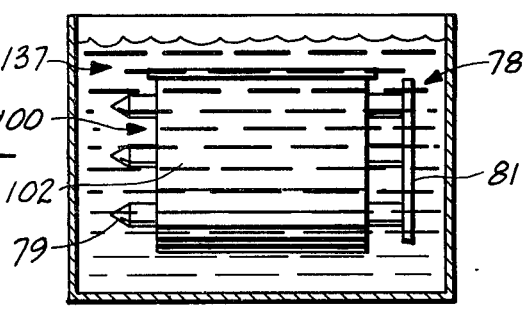
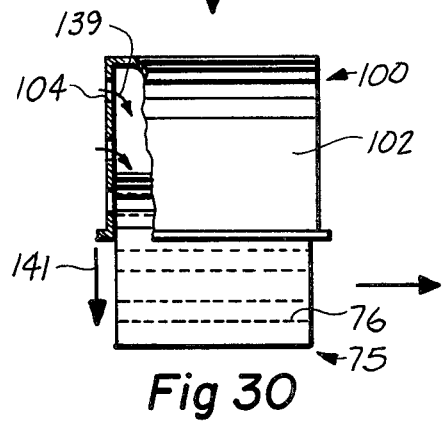
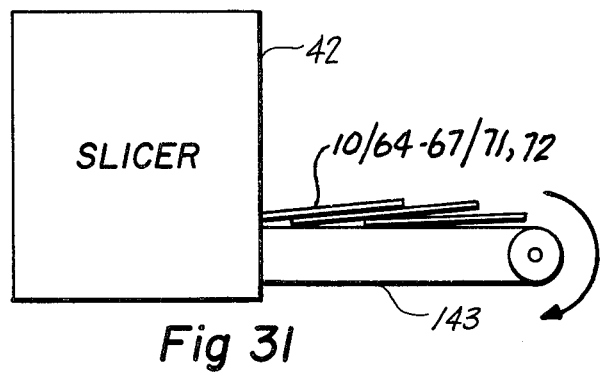
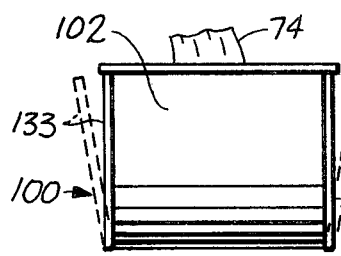
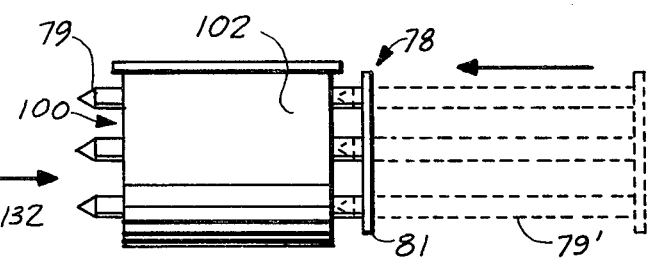

PIZZA PIE AND PIE MAKING METHODS

CROSS-REFERENCE

This is a continuation-in-part of patent application Ser. No. 740,288, entitled Pizza Pie and Pie Making Methods, filed by the subject inventor on Nov. 9, 1976 now abandoned, and herewith incorporated by reference herein.

BACKGROUND OF THE INVENTION

1. Field of the Invention

The subject invention relates to pizza pies and similar food products and to methods for making same.

2. Description of the Prior Art

Pizza pies and similar food products traditionally have a cheese covering on top of tomato sauce or other food items and an underlying pie shell. Traditionally, the cheese covering is made by grating or otherwise working cheese into strips or other fine particles which are sprinkled onto the tomato sauce or other food items on the pie shell and which are thereupon fused together by heat.

In actual practice, this kind of application of the cheese covering is a rather onerous task which for its proper performance places far too much reliance on the skill of the operator than should realistically be required of what should really be a routine operation, considering the circumstances under which most pizza pies are made day after day and year after year during rush hours and in very competitive and impatient environments.

As a result, far too many pizza pies available to the public in innumerable parlors, stands and franchise outlets typically have cheese coverings of greatly uneven thickness and textures across the pie. Also, the grated cheese tends to fall off or to the side of the pie onto the hot surface of the baking oven, thereby engendering the obnoxious odor of burnt cheese. Besides, considerable time and overhead costs are now consumed in the process of cutting and grinding cheese and in the further process of measuring out the ground cheese for each pie. Also, the ground or grated cheese tends to dry out and pick up odors from refrigeration or other environments.

Moreover, many otherwise worthy unempolyed persons find themselves unable to hold down a job in a pizza parlor because of the high skill required in the application of grated cheese for the production of an even and well-textured cheese covering.

Despite a multitude of prior-art efforts to improve the traditional pizza pie and its manufacture, the art in the specific area herein under consideration has been disappointingly stagnant. This may, for instance, be seen from a consideration of the following issued U.S. patents, which have been located in the course of a novelty search and which are herewith cited even though not all of them appear relevant: U.S. Pat. Nos. 61,638, 229,320, De.234,233, 1,036,251, 1,201,825, 1,383,290, 1,583,782, 2,291,529, 2,668,117, 2,684,906, 2,774,316, 2,971,846, 3,046,140, 3,141,779, 3,379,141, 3,381,632, 3,411,921, 3,635,729, 3,695,894, 3,745,019, 3,773,520, 3,879,564, 3,900,574 and 3,956,518. These patents and their disclosures are herewith incorporated by reference therein.

Mechanical equipment for applying topping materials to pizza shells have brought some relief, but have retained some of the problems and introduced new ones. For instance, the machinery disclosed in U.S. Pat. No. 3,648,596 repeats and extends the prior-art practice of providing and applying the topping material in a shredded or grated condition.

In practice, whether a shredded or grated cheese topping is applied manually or mechanically, the problem of evaporative losses persists. In particular, conventional pizza toppings lose some 20 to 30 percent of their weight by evaporation during baking because of the shredded or grated condition of the cheese topping.

Also, the above mentioned U.S. Pat. No. 3,648,596 does not teach a separate application of the cheese topping on top of a previously applied topping of chopped meat, ground pepperoni, ground sausage and similar topping materials in the traditional tomato sauce on the pizza shell. An application of one or more of such latter topping materials in admixture with shredded cheese is undesirable in practice, since the texture, structure and taste required in or of a pizza pie render it mandatory that the cheese topping in fact constitute the top layer of the pizza pie, to be and to remain on top of the pie, except for some tomato sauce exuding through portions of the cheese topping.

Another drawback of machinery which performs all phases of the pizza topping applying process is that it is capital intensive and thus beyond the reach of most pizza parlor operations, and that it deprives people, who heretofore applied the pizza topping manually of their jobs and livelihood.

In a somewhat related area, a so-called Western style pizza has been proposed (see Woman's Day Encyclopedia of Cookery (Fawcett Publications, New York), Vol. 10, p. 1604). Such "Western style pizza" is prepared by splitting bread lengthwise and spreading the pieces with a tomato mixture. Cheese slices are arranged on top of these tomato-mixture-spread split bread pieces and are sprinkled with grated cheese. This combination is then put uner a broiler until bubbly.

While it appears possible that such prior-art use of cheese slices may, for instance, reduce the above mentioned evaporation problem to some extent, the use of cheese slices in addition to, or instead of, grated cheese does not as such solve the problem of providing pizza pies being at least equivalent in texture, structure and composition to a most carefully prepared prior-art pizza pie having grated cheese topping applied by a highly skilled operator.

For instance, prior-art cheese slices applied to the typically round or circular pizza pie shell will leave empty spaces in the cheese topping through which tomato mix can unduly evaporate, and which make for a non-uniform cheese topping. Tailoring prior-art cheese slices to the configuration of pizza pies would put a considerable added burden on the operator or person applying the cheese topping, if a uniformity of composition and texture similar to those attainable by a most carefully applied grated cheese topping were to be realized.

Moreover, conventional slices of the type of cheese actually suitable for pizza pie trap the acid or other vapor and the heat from the tomato mix. In consequence, bubbles form in the cheese topping and often have to be punctured or cut to permit an escape of rising tomato mix vapors and to prevent contact between cheese topping and hot oven parts which would burn the cheese. Even if such bubbles burst of themselves, the erupting gases or vapors tear up the cheese topping and make for an unsightly and uneven textured pie.

This kind of problem also exists to some extent with cheese toppings made of grated cheese, since the heat of the oven causes the grated cheese layer to melt into one or more cheese patches which trap gases and vapor.

Also conventional cheese toppings are often dislodged when the pie is put into the oven. Especially grated cheese topping tends to fall of the pie by force of inertia in response to any jerky motion of the pie during its insertion into the oven, thereby engendering the above mentioned obnoxious odor of burnt cheese and also impairing the texture of the pie topping.

This problem is also present if conventional cheese slices are used to compose the cheese topping, since such slices also can fall off the pie rather easily.

Also, neither the conventional cheese slices nor grated cheese toppings are capable of retaining the underlying tomato spread on the pie when the same is inserted into the oven in a jerky motion. Rather, tomato mix will be thrown off the pie by force of inertia, thereby contacting hot oven parts, which generates obnoxious odors.

SUMMARY OF THE INVENTION

It is a broad object of this invention to overcome the above mentioned disadvantages.

It is a germane object of this invention to provide an improved method of making pizza pies and to provide improved pizza pies made by that method.

It is a related object of this invention to facilitate the making of pizza pies and to improve the uniformity of thickness and texture of cheese coverings on such pies.

It is a further object of this invention to provide improved pizza pie cheese toppings and methods of making same.

It is also an object of this invention to provide improved articles of manufacture from which pizza pies may be made by exposure to heat.

Other objects will become apparent in the further course of this disclosure.

The expression "pizza pie" as herein employed is not intended to be limited to the familiar kind of tomato pie by that name, but is intended to be broad enough to cover similar pies having a cheese covering on at least partially vapor or juice emitting food items.

From a first aspect thereof, the subject invention resides in a method of making a pizza pie of the type having a pie shell including a peripheral region, food items covering said pie shell up to said peripheral region and including a sauce emitting vapor and juice upon heating, and cheese topping on said food items.

The invention according to this aspect resides, more specifically, in the improvement comprising in combination the steps of providing up to four geometrically congruent slices of pizza pie topping cheese, including dimensioning each of said slices to extend from the center of the pie into said peripheral region and to extend along a portion of said peripheral region corresponding to the length of said peripheral region divided by the number of said up to four slices, further dimensioning said slices jointly to cover said food items and extend along and into said peripheral region in one layer composed of said slices when contiguously arranged on said food items, and providing each of said slices with several apertures through which vapor and juice can rise from said food items including said sauce, contiguously arranging said apertured slices on said food items to form said one layer covering said food items and extending into said peripheral region, retaining said food items including said sauce on said pie shell with the weight of said contiguously arranged apertured slices against lateral forces of inertia occurring during handling of the pie prior to heating, and subjecting said pie shell, contiguously arranged apertured slices of cheese and covered food items including said sauce, to heat and causing vapor and juice from said covered food items including said sauce to rise through apertures in said slices of cheese and said slices of cheese to soften into partial conformity with said food items on said pie shell.

From another aspect thereof, the subject invention resides in a method of making a pizza pie of the type having a pie shell including a circular peripheral region, food items covering said pie shell up to said circular peripheral region and including a sauce emitting vapor and juice upon heating, and a cheese topping on said food items. The invention according to this aspect resides, more specifically, in the improvement comprising in combination the steps of providing two semicircular slices of pizza pie topping cheese, including dimensioning said two semi-circular slices jointly to cover said food items and extend along and into said circular peripheral region in one layer composed of said two slices when contiguously arranged on said food items, and providing each of said slices with several apertures through which vapor and juice can rise from said food items including said sauce, contiguously arranging said apertured slices on said food items to form said one layer covering said food items and extending into said peripheral region, retaining said food items including said sauce on said pie shell with the weight of said contiguously arranged apertured slices against lateral forces of inertia occurring during handling of the pie prior to heating, and subjecting said pie shell, contiguously arranged apertured slices of cheese and covered food items including said sauce, to heat and causing vapor and juice from said covered food items including said sauce to rise through apertures in said slices of cheese and said slices of cheese to soften into partial conformity with said food items on said pie shell.

From another aspect thereof, the subject invention resides in a method of making a pizza pie of the type having a pie shell including a peripheral region, food items covering said pie shell up to said peripheral region and including a sauce emitting vapor and juice upon heating, and a cheese topping on said food items. The invention according to this aspect resides, more specifically, in the improvement comprising in combination the steps of providing an integral slice of pizza pie topping cheese, including dimensioning said integral slice to cover said food items and extend along and into said peripheral region in one piece when arranged on said food items, and providng said integral slice with several apertures through which vapor and juice can rise from said food items including said sauce, arranging said integral slice on said food items to cover said food items and extend into said peripheral region in one piece, retaining said food items including said sauce on said pie shell with the weight of said integral slice against lateral forces of inertia occurring during handling of the pie prior to heating, and subjecting said pie shell, apertured integral slice of cheese and covered food items including said sauce, to heat and causing vapor and juice from said covered food items to rise through apertures in said integral slice of cheese and said integral slice of cheese to soften into partial conformity with said placed food items on said pie shell.

From another aspect thereof, the subject invention resides in pizza pies made by methods according to the subject invention. Such pizza pies are characterized by a cheese covering of superior uniformity and texture, and thus of improved manageability and tastiness, as compared to pizza pies made by prior-art methods.

From another aspect thereof, the subject invention resides in a method of making a cheese topping for a pizza pie of the type having a pie shell including a peripheral region, food items covering said pie shell up to said peripheral region and including a sauce emitting vapor and juice upon heating, and the cheese topping on said food items. The invention according to this aspect resides, more specifically, in a combination of steps comprising providing for each cheese topping up to four geometrically congruent slices of pizza pie topping cheese, including dimensioning each of said slices to extend from the center of the pie into said peripheral region and to extend along a portion of said peripheral region corresponding to the length of said peripheral region divided by the number of said up to four slices, further dimensioning said slices jointly to cover said food items and extend along and into said peripheral region in one layer composed of said slices when contiguously arranged on said food items, and providing each of said slices with several apertures through which vapor and juice can rise from said food items including said sauce.

From another aspect thereof, the subject invention resides in a method of making a cheese topping for a pizza pie of the type having a pie shell including a circular peripheral region, food items covering said pie shell up to said circular peripheral region and including a sauce emitting vapor and juice upon heating, and the cheese topping on said food items. The invention according to this aspect resides, more specifically, in a combination of steps comprising providing two semicircular slices of pizza pie topping cheese, including dimensioning said two semicircular slices jointly to cover said food items and extend along and into said circular peripheral region in one layer composed of said two slices when contiguously arranged on said food items, and providing each of said slices with several apertures through which vapor and juice can rise from said food items including said sauce.

From another aspect thereof, the subject invention resides in a method of making a cheese topping for a pizza pie of the type having a pie shell including a peripheral region, food items covering said pie shell up to said peripheral region and including a sauce emitting vapor and juice upon heating, and the cheese topping on said food items. The invention according to this aspect resides, more specifically, in a combination of steps comprising providing an integral slice of pizza pie topping cheese, including dimensioning said integral slice to cover said food items and extend along and into said peripheral region in one piece when arranged on said food items, and providing said integral slice with several apertures through which vapor and juice can rise from said food items including said sauce.

From another aspect thereof, the subject invention resides in an article of manufacture comprising, in combination, a pie shell having a peripheral region, food items covering said pie shell up to said peripheral region and including a sauce emitting vapor and juice upon heating, and a cheese topping on said food items, comprising up to four geometrically congruent slices of pizza pie topping cheese contiguously arranged on, and jointly covering, said food items in one layer composed of said slices and extending along and into said peripheral region, and each of said slices having several apertures for releasing vapor and juice from said food items including said sause.

From another apsect thereof, the subject invention resides in an article of manufacture comprising, in combination, a pie shell having a circular peripheral region, food items covering said pie shell up to said circular peripheral region and including a sauce emitting vapor and juice upon heating, and a cheese topping on said food items comprising two semicircular slices of pizza pie topping cheese contiguously arranged on, and jointly covering said food items in one layer composed of said two slices and extending along and into said circular peripheral region, each of said slices having several apertures for releasing vapor and juice from said food items including sauce.

From another aspect thereof, the subject invention resides in an article of manufacture comprising, in combination, a pie shell having a peripheral region, food items covering said pie shell up to said peripheral region and including a sauce emitting vapor and juice upon heating, and a cheese topping on said food items, comprising an integral slice of pizza pie topping cheese arranged on, and covering, said food items in one piece extending along and into said peripheral region, said integral slice having several apertures for releasing vapor and juice from said food items including said sauce.

In the practice of the subject invention, the defined method steps need not necessarily be performed in the sequence in which they have been recited herein. Rather, any and all useful combinations of recited method steps are intended to be covered hereby.

The articles of manufacture just defined may be in an uncooked or unbaked state. These articles of manufacture have intermediate utility in that they are readily capable of being made into pizza pies or similar food products by exposure to heat.

From still another apsect thereof, the subject invention resides in an article of manufacture for application to and for covering a pie shell having a peripheral region and food items arranged on the pie shell up to the peripheral region and including a sauce emittng vapor and juice upon heating. According to this aspect of the subject invention, the article of manufacture comprises a cheese topping for said food items, comprising for each topping up to four geometrically congruent slices of pizza pie topping cheese dimensioned jointly to cover said food items and extend along and into said peripheral region in one layer composed of said slices when contiguously arranged on said food items, each of said slices being further dimensioned to extend from the center of the food items on the pie shell into said peripheral region and to extend along a portion of said peripheral region corresponding to the length of said peripheral region divided by the number of said up to four slices, and each of said slices having several apertures for releasing vapor and juice from said food items including said sauce.

From another aspect thereof, the subject invention resides in an article of manufacture for application to and covering a pie shell having a circular peripheral region and food items arranged on said pie shell up to said peripheral region and including a sauce emitting vapor and juice upon heating. According to this apsect of the subject invention the article of manufacture comprises a cheese topping for said food items, comprising two semicircular slices of pizze pie topping cheese dimensioned jointly to cover said food items in one layer composed of said two slices and extending along and into said circular peripheral region when said two slices are contiguously arranged on said food items, each of said slices having several apertures for releasing vapor and juice from said food items including said sauce.

From another aspect thereof, the subject invention resides in an article of manufacture for application to and for covering a pie shell having a peripheral region, and food items arranged on said pie shell up to said peripheral region and including a sauce emittng vapor and juice upon heating. According to this aspect of the subject invention the article of manufacture comprises a cheese topping for said food items, comprisng an integral slice of pizza pie topping cheese dimensioned to cover said food items in one piece extending along and into said peripheral region when arranged on said food items, said integral slice having several apertures for releasing vapor and juice from said food items including said sauce.

The latter articles of manufacture also had intermediate utility in that they are readily applicable as cheese toppings to pizza pies and similar products in the manufacture or making of such pizza pies or products.

BRIEF DESCRIPTION OF THE DRAWINGS

The invention and its objects and aspects will become more readily apparent from the following detailed description of preferred embodiments thereof, illustrated by way of example in the accompanying drawings, in which like reference numerals designate like or functionally equivalent parts, and in which:

FIG. 1 is a top or bottom view of an apertured integral slice of cheese of sufficient width to cover a pie and food items deposited thereon in one piece according to the subject invention;

FIG. 2 is a side view, partially in section, of the integral slice of cheese of FIG. 1;

FIG. 3 is a side view, partially in section, of an article of manufacture according to a preferred embodiment of the subject invention;

FIG. 4 is a view, similarly to FIG. 1, on a reduced scale, showing modifications in accordance with preferred embodiments of the subject invention;

FIG. 5 is a side view of a system for preparing the integral slice of cheese in accordance with a preferred embodiment of the subject invention;

FIG. 6 is a section through a mold or similar equipment for making an integral slice of cheese in accordance with a preferred embodiment of the subject invention;

FIG. 7 is a top view of the system shown in FIG. 5;

FIG. 8 is a detail view, on an enlarged scale, of the system shown in FIGS. 5 and 7;

FIG. 9 is a top view of a modification of the system shown in FIGS. 5, 7 and 8;

FIG. 10 is a top view of the mold shown in FIG. 6;

FIG. 11 is a top view of a modification of the mold shown in FIGS. 6 and 10;

FIG. 13 is a top or bottom view of a further cheese topping in accordance with a preferred embodiment of the subject invention;

FIG. 14 is a side view, partially in section, of the cheese topping according to FIG. 13;

FIG. 15 is a side view, partially in section, of an article of manufacture in accordance with a preferred embodiment of the subject invention;

FIG. 16 is a view, similar to FIG. 13, on a reduced scale, showing a modification in accordance with preferred embodiments of the subject invention;

FIG. 21 is a side view of a mold assembly for preparing cheese topping according to a further preferred embodiment of the subject invention;

FIGS. 26 to 31 constitute a flow sheet showing use of the mold assemblies of FIGS. 21 to 25 and, in general, showing phases of the preparation of cheese topping in accordance with a preferred embodiment of the subject invention; and FIGS. 32 and 33 show a modification of FIG. 26 in accordance with a preferred embodiment of the invention.

DESCRIPTION OF PREFERRED EMBODIMENTS

Figure 12:
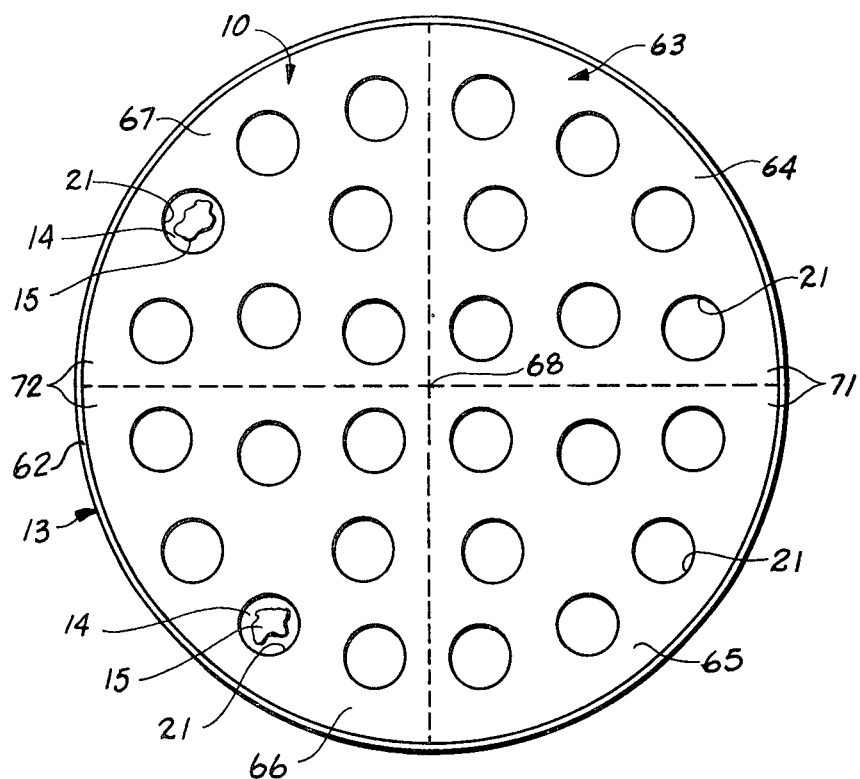
FIG. 12 is a top view of the article of manufacture shown in FIG. 3.

The integral slice of cheese 10 shown in FIG. 1 has a circular periphery 12 and is thus round in accordance with a preferred embodiment of the subject invention.

In the practice of the subject invention, the cheese slice 10 is of sufficient width to cover in one piece a pie shell and food items placed thereon.

By way of example, FIG. 3 shows a pie shell 13 of the type used in the manufacture of pizza pies. Typically, the pie shell 13 is made from a bread dough containing high gluten flour. Of course, no limitation to any particular dough or, for that matter, to any particular kind of pie is herein intended.

In accordance with conventional practice, at least partially juice emitting food items 14 are placed on the pie shell 13. In the case of pizza pie, a familiar juice emitting food item is tomato sauce 15 which is spread onto and across the pie shell 13. Other food items or slices thereof may also be placed on the pie shell 13. For instance, food items such as pepperoni, mushrooms, peppers, onions, olives and sausage slices 16 are frequently placed on the pie shell in addition to the tomato sauce.

As already indicated, the integral slice of cheese 10 is of sufficient width to cover the placed food items and also the underlying pie shell in one piece.

In this respect, it will be noted that the term width in the illustrated preferred embodiments covers not only one dimension, but actually the two-dimensional extent of the cheese slice 10.

The thickness of the cheese slice 10 is bounded by two surfaces 18 and 19. This thickness is essentially uniform and represents the uniform thickness of the cheese covering on the finished pie product.

In accordance with an important feature of the subject invention, the cheese slice 10 is apertured. For instance, the slice 10, prior to its application to the food items 14 and pie shell 13, is provided with uniformly distributed apertures 21 throughout the slice of cheese. I presently prefer apertures 21 having a diameter or width of from one-quarter inch to one-half inch. I also prefer presently a mutual spacing of the apertures 21 by distances of from one-quarter inch to one inch.

In the practice of my invention, the apertured nature of the cheese slice or disk 10 is essential, in that the apertures 21 provide vents for tomato sauce or other juices rising from the food items 14 during the baking of the pie. Without such vents, any intelgral cheese layer on the pie would bubble up, thereby in effect destroying the pie or at least the desired appearance or constitution thereof. Especially in the case of the traditional type of pizza pie, it is important that part of the tomato sauce will come to be located on top of the cheese covering during the baking process. Provision of the apertures 21 at a uniform distribution or regular pattern in accordance with a preferred embodiment of the subject invention assures in practice uniformity of the pie composition and constitution throughout its width.

This is considered important not only in terms of appearance, but also in terms of taste.

The apertures 21 may be provided in the integral slice 10 in one of several ways. For instance, a female die or matrix 23 may include as many holes 24 as there are apertures to be cut. These holes 24 would be dimensioned and distributed in the manner of the desired apertures 21. A plate 25, slidable up and down in lateral guides 26 carries male punches 27 corresponding in size and position to the holes 24 in the matrix. The slice of cheese 10 would be placed on the base of the matrix 23 and the plate 25 would be pushed down against the bias of springs 28. In this manner, the punches 27 would provide the holes 21 in the cheese slice 10. Of course, numerous die mechanisms or punch and matrix assemblies may be utilized to provide the requisite apertures 21 in the cheese slice. Indeed, these apertures could be provided in a thicker piece of cheese from which the slices would thereupon be cut.

For instance, a cheese mold or similar structure 31 could be provided with vertical pegs or dowels 32 which would leave apertures 21' in a thicker piece of cheese 10' when the same is cast or otherwise processed in the mold. If desired, removal of the apertured piece of cheese 10' may be facilitated by an ejector plate 33 actuated, for instance, via one or more pins 34.

Various techniques and apparatus for molding and/or slicing cheese are known in the food processing art, as may, for instance, be seen from the incorporated above mentioned patents. Also, known cheese making processes can be conducted so that the resulting cheese will have numerous uniformly distributed holes throughout.

Typically, the integral apertured cheese slice 10 is initially in an uncooked state, at least relative to the cooking or heating it will be subjected to during the final baking of the pie. The uncooked apertured integral slice of cheese is applied to the pie shell 13 and deposited food items 14 as shown in FIG. 3. As indicated above, the applied uncooked apertured integral slice of cheese on the food items 14 and pie shell 13 is of sufficient width to cover these food items and pie shell in one piece. If desired, the intermediate product thus prepared may be sold and distributed in this form for subsequent baking by or for the consumer at the point of consumption.

The integral slice of cheese may be square or rectangular as shown at 10" in FIG. 4. Also, the apertures may then be round as shown at 21, rectangular or square as shown at 21", or may have any other desired shape.

In practice, one or more cheeses or cheese blends may be employed. For instance, the cheese slice 10 in the case of pizza pie may be made of mozzarella, Parmesan, Muenster or jack cheese or blends thereof.

As indicated only in diagrammatic form at 36 in FIG. 3, the apertured integral slice of cheese 10, covered food items 14 and pie shell are subjected to heat 37 whereby juices from the covered tomato sauce and/or other food items are caused to rise through the apertures 21 in the integral slice of cheese and whereby this integral slice of cheese is caused to soften into partial conformity with the placed or positioned food items on the pie shell 13. This heating process, which may be carried out in an oven, is typically continued until the pie has been baked and is ready for serving.

It will be recognized that the preferred embodiments meet all of the objects of the subject invention. In addition, no grinding or grating of cheese and no measured and skillful application of grated cheese to the pie are necessary. Rather, the cheese slices 10 may readily be removed from a packaged stack of such slices, and may be applied even by an unskilled person in order to produce a cheese covering which is characterized by a large uniformity of thickness and texture between the apertures 21.

By using my apertured cheese slices 10, the time required for making pizza pies is very considerably reduced and no obnoxious odors from fallen off and burnt cheese particles will result. The cut cheese slices 10 can easily be retained in a package that, up to the point of actual use of the cheese slices will prevent the cheese product from picking up odors from refrigeration or other environments.

As shown in FIGS. 5 and 7, the apertures 21 in the cheese slice 10 are, in accordance with a preferred embodiment of the subject invention, provided by punching holes into a slice or piece of pizza pie topping cheese.

As mentioned above, and as shown in FIG. 8, the apertures or holes 21' corresponding thereto, may be provided in a thicker piece 41 of pizza pie topping cheese. The requisite cheese topping slices according to the subject invention may thereupon be cut from the thicker piece of cheese 41 in a slicer as diagrammatically indicated at 42 in FIG. 31.

In accordance with a preferred embodiment of the subject invention, the punching elements 27 may be in the form of tubes 43, one of which is shown in FIG. 8. These tubes are set such as by a press-fit or other conventional fastening techniques in corresponding holes 44 in the punch plate 25.

The punching tubes 43 have a cutting edge 45, as required for the particular kind of cheese to be cut, and have a longitudinal passage 46 through which punched-out pegs of cheese 47 may rise to leave the tube above the punch plate 25 for reclamation or recycling.

The punching tubes 43 may be hollow-cylindrical if the holes 21' and apertures 21 are to be round. Hollow-prismatic punching tubes may be employed for square apertures 21" or for triangular apertures, to name two of several further possible examples.

As also shown in FIG. 8, the punches 27 may be forced into the piece of cheese 41 in the direction of an arrow 49 by a hydraulic actuator, diagrammatically illustrated at 51 and acting on the punch plate 25 via a plunger or rod 52. The actuator 51 may also be employed to withdraw the punches 27 from the piece of cheese in a direction opposite to the direction of the arrow 49 at the end of each punching cycle. A hold-down plate 53 may be employed to hold down the apertured piece of cheese 41 on the matrix plate 23 when the punch elements 27 are withdrawn.

The hold-down plate 53 is held stationary during withdrawal of the punch elements from the apertured piece of cheese, and is the functional equivalent of the ejector plate 33 shown in FIG. 6, in that it induces or permits movement of the apertured piece of cheese relative to the aperture forming elements.

In practice, the hold-down plate 53 will not be necessary if the weight of the piece of cheese 41 is sufficient to retain the piece on the baseplate or matrix 23 while the punch plate 25 and punching elements 27 are withdrawn therefrom.

As more fully set forth below, the single cheese topping layer on the pizza pie may be composed of up to four geometrically congruent slices of pizza pie topping cheese. According to preferred embodiments of the subject invention, this includes the integral single slice of cheese 10 shown in FIGS. 1 to 3 and 7 hereof, as well as the semicircular slices shown in FIGS. 13 to 15 and the quarter round slices shown in FIG. 17, for instance.

In this respect, the semicircular and the quarter round molds shown in FIGS. 21 to 23 and 24 and 25 may be employed for making semicircular or quarter round pieces of cheese into which the apertures 21 and 21" are punched prior to slicing. In that case, the rods for providing holes through the cheese in the various molds, and the apertures in the molds provided for receiving such rods, may be omitted.

By way of example, FIG. 9 shows a semicircular piece of cheese 54 which is being provided with holes 21' of the type shown in FIG. 8, by means of a punching press similar to the press shown in FIGS. 5, 7 and 8.

According to FIG. 9, holes are punched into a semicircular piece of cheese 54 by a punching press closely similar to the press shown in FIGS. 5, 7 and 8, but dimensioned to handle semicircular pieces of cheese of the desired size or sizes.

The semicircular piece of cheese 54 with holes 21' may then be sliced as shown at 42 in FIG. 13, in order to provide cheese topping having single layers composed of contiguously arranged semicircular pieces of pizza pie topping cheese.

The principle illustrated with the aid of FIGS. 5 and 7 to 9 may also be utilized to cut holes in quarter round pieces of cheese, which are subsequently sliced as shown at 42 in FIG. 31 in order to provide single-layer cheese toppings composed of contiguously arranged quarter round slices of cheese provided with the apertures 21 according to the subject invention, as illustrated with the aid of FIG. 17.

FIG. 10 shows a top view of the mold illustrated in FIG. 6. In order to show the ejector plate 33 with its apertures 56 around the dowels 32, the piece of cast cheese 10' has not been shown in the top view of FIG. 10. In analogy to the above mentioned hold-down plate 53 (see FIG. 8), the ejector plate 33 may be omitted if the mold 31 can be inverted after the cheese has solidified therein and if such solidified piece of cheese can leave the mold and the dowels under its own weight.

The modified mold 57 with ejector plate 58 shown in FIG. 11 is a semicircular version of the mold 31 and ejector plate 33.

The mold 57 defines a semicircular cavity into which a solidifiable fluid mass of cheese (see FIG. 26) may be cast. Upon solidification, the cast cheese forms a solidified or solid piece of cheese having holes or apertures provided for by the dowels 32. Semicircular slices may be cut from the apertured piece of cheese formed in the mold shown in FIG. 11, in order to form cheese toppings composed of two contiguously arranged apertured semicircular slices of cheese (see FIGS. 13 to 15). A slicer is diagrammatically illustrated at 42 in FIG. 31.

As indicated by dotted lines 61 in FIG. 11, the semicircular mold 57 may be converted into a mold defining a quarter round cavity in which quarter round pieces of cheese may be cast and provided with holes or apertures by the dowels 32.

The quarter round pieces of cheese may be cut into quarter round slices (see slicer 42 in FIG. 31) and each set of four of such slices (see FIG. 17) may then be used to form one layer of cheese topping by contiguous arrangement of such or quarter round pieces on the food items on the pie shell.

With reference to FIGS. 3 and 12, it will be recalled that the pizza pie presently under consideration is of the type having a pie shell 13 including a peripheral region 62, food items 14 covering the pie shell up to that peripheral region and including a sauce 15 emitting vapor and juice upon heating, and the cheese topping on the food items. In the embodiment shown in FIGS. 1 to 3, the cheese topping is in the form of an integral slice of pizza pie topping cheese 10, and is dimensioned to cover the food items 14 and extend along and into the peripheral region of the pie shell in one piece, when the integral slice 10 is arranged on the food items. The integral slice 10 has or is provided with several apertures 21 through which vapor and juice can rise from the food items including the sauce 15.

The integral slice 10 is arranged on the food items to cover these food items and extend into the peripheral region of the pie shell in one piece. The food items 14, including the sauce 15, are retained on the pie shell 13 with the weight of the integral slice against lateral forces of inertia occurring during handling of the pie prior to heating.

In particular, and as mentioned above, conventional cheese toppings are often dislodged when the pie is put into the oven. Especially grated cheese topping, and to some extent also conventional strips or slices of cheese, tend to fall off the pie by force by inertia in response to any jerky motion of the pie during its insertion into the oven, thereby engendering the above mentioned obnoxious oder of burnt cheese and also impairing the texture of the pie topping.

The weight of the cheese topping 10 according to the subject invention retains the food items including the sauce 15 on the pie shell with its weight. This effect is particular strong when the cheese topping consists of one integral slice of cheese as shown in FIGS. 1 to 3. In practice, this effect is also present when the cheese topping is composed of two contiguously arranged semicircular slices as shown in FIGS. 13 to 15, or even when the cheese topping is composed of up to four contiguously arranged slices of cheese as shown in FIGS. 12 and 17.

The showing of FIG. 12 is universal to the three main versions of the cheese topping according to the subject invention.

For instance, and as already explained above, the cheese topping can consist of one integral cheese slice which, as shown at 10 in FIGS. 1 to 3 and 12 may be circular for circular pizza pies or as shown in FIG. 4 at 10" may be square for square pizza pies.

In either case, the integral slice 10 or 10" extends into and along the periphery or perimeter of the pie.

As also shown in FIG. 12, a cheese topping 63 may be made by providing up to four geometrically congruent slices of pizza pie topping cheese 64, 65, 66 and 67. Each of these slices is dimensioned to extend from the center 68 of the pie into the peripheral region 62 and to extend along a portion of that peripheral region corresponding to the length of such peripheral region divided by the number of the up to four slices.

For instance, if the up to four slices are in fact one slice 10, then that slice 10 extends along the entire length of the peripheral region 62. On the other hand, it the slices are four in number as shown in FIG. 12 at 64 to 67, then each slice extends along a different quarter of the length of the peripheral pie region 62. By way of further example, if the number of slices per pie topping is two, such as in the case of semicircular slices, then each slice extends along one half of the peripheral region of the pie shell.

The up to four slices (such as one, two or four slices) per cheese topping are further dimensioned jointly to cover the food items and extend along and into the peripheral region 62 in one layer composed of these slices when contiguously arranged on the food items. As already discussed, each of the slices is provided with several apertures through which vapor and juice can rise from the food items including the sauce.

Figure 17:
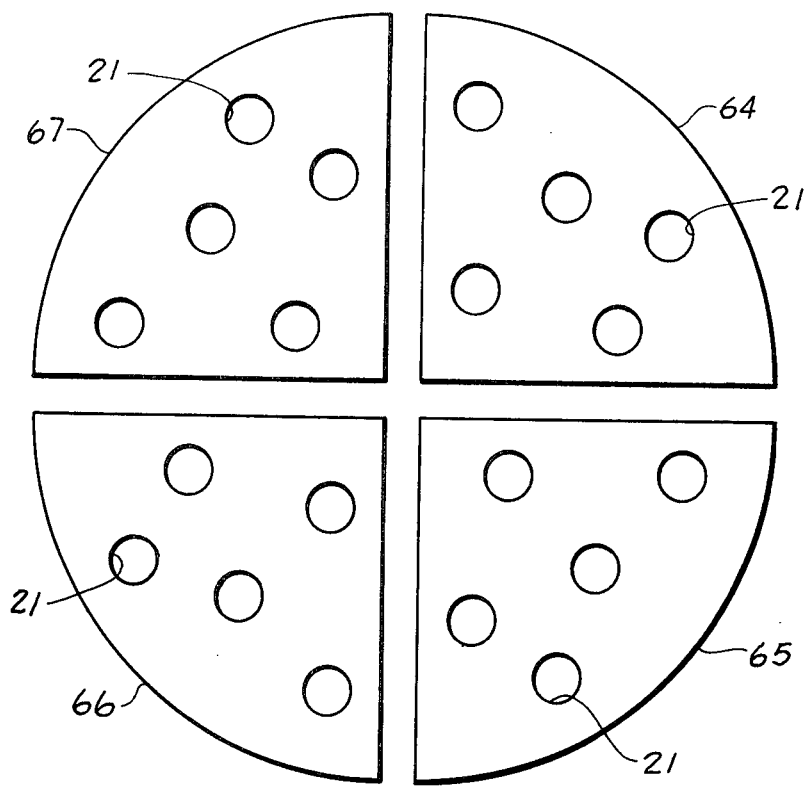
FIG. 17 is a top or bottom view of a further cheese topping in accordance with a preferred embodiment of the subject invention.

With reference to FIG. 17, and as shown in FIG. 12, the up to four apertured slices 64 to 67 are contiguously arranged on the food items to form the above mentioned one layer covering the food items and extending into the peripheral region 62.

As indicated above, the resulting cheese topping layer retains the food items including the sauce 15 on the pie shell 13 with the weight of the contiguously arranged apertured slices against lateral forces of inertia occurring during handling of the pie prior to heating. The pie shell 13, the contiguously arranged apertured slices of cheese 64 to 67 and covered food items 14 including the sauce 15 are subjected to heat whereby vapor and juice are caused to rise from the covered food items 14 including the sauce 15 through the apertures 21 in slices of cheese, and the slices of cheese are caused to soften into partial conformity with the food items on the pie shell. The result is a pizza pie of superior quality in terms of tastiness, texture and distribution of the cheese topping. In particular, the acid or other vapor and the heat from the tomato sauce or mix can rise through the cheese topping and the formation of large bubbles is effectively avoided.

From the point of view of uniformity and integrity, the version providing the cheese topping in one integral slice of cheese presently appears the most preferable.

From the point of view of ease of manufacture, packaging and handling, the version employing four slices of cheese 64 to 67 appears to have its advantages.

However, the presently most preferred version from an overall point of view, including quality of the cheese topping in the light of ease of manufacture, slicing, packaging and handling, is the version which composes each topping layer of two semicircular pieces of cheese.

Two semicircular pieces of pizza pie topping cheese are indicated in FIG. 12 with the aid of reference numerals 71 and 72 having brackets associated therewith. In particular, the bracket associated with the reference numeral 71 is intended to indicate that the semicircular slice of cheese 71 extends over the quarter round sections 64 and 65. Similarly, the bracket associated with the reference numeral 72 is intended to indicate that the semicircular slice of cheese extends over the quarter round sections 66 and 67. The semicircular cheese slices 71 and 72 indicated in FIG. 12 are perhaps more clearly apparent from FIG. 13.

Accordingly, in line with the presently most preferred embodiment of the subject invention, there are provided two semicircular slices of pizza pie topping cheese 71 and 77. The two semicircular slices 71 and 72 are dimensioned jointly to cover the food items and extend along and into the circular peripheral region 62 of the pie shell in one layer composed of the two slices when contiguously arranged on the food items.

Again, each of the slices 71 and 77 is provided with several apertures 21 through which vapor and juice can rise from the food items including the sauce 15. As shown in FIGS. 12 and 15, the apertured semicircular slices 71 and 72 are contiguously arranged on the food items to form the one layer covering the food item and extending into the peripheral region 62. Again, the food items including the sauce 15 are retained on the pie shell with the weight of the contiguously arranged apertured slices 71 and 72 against lateral forces of inertia occurring during handling of the pie prior to heating.

The pie shell, contiguously arranged apertured slices of cheese 71 and 72 and covered food items including the sauce 15 are subjected to heat as indicated in FIG. 15 at 36, whereby vapor and juice from the covered food items including the sauce 15 are caused to rise through apertures 21 in the slices of cheese 71 and 72, and these slices are caused to soften into partial conformity with the food items on the pie shell.

The uniform distribution and dimensioning of the apertures 21, as well as their preferred mutual spacing, may be similar in all versions herein shown. Also, the apertures may be provided in the same manner in all cheese topping pie versions herein shown.

In terms of methods, the subject invention extends to the pizza pie making methods and to the cheese topping making methods herein disclosed. In terms of articles of manufacture, the subject invention extends to pizza pies and also to cheese toppings made by methods herein disclosed.

In terms of articles of manufacture, the subject invention also extends to the pizza pie structures in an uncooked or cooked state, and to the cheese toppings herein disclosed.

Figures 18, 19, 20:
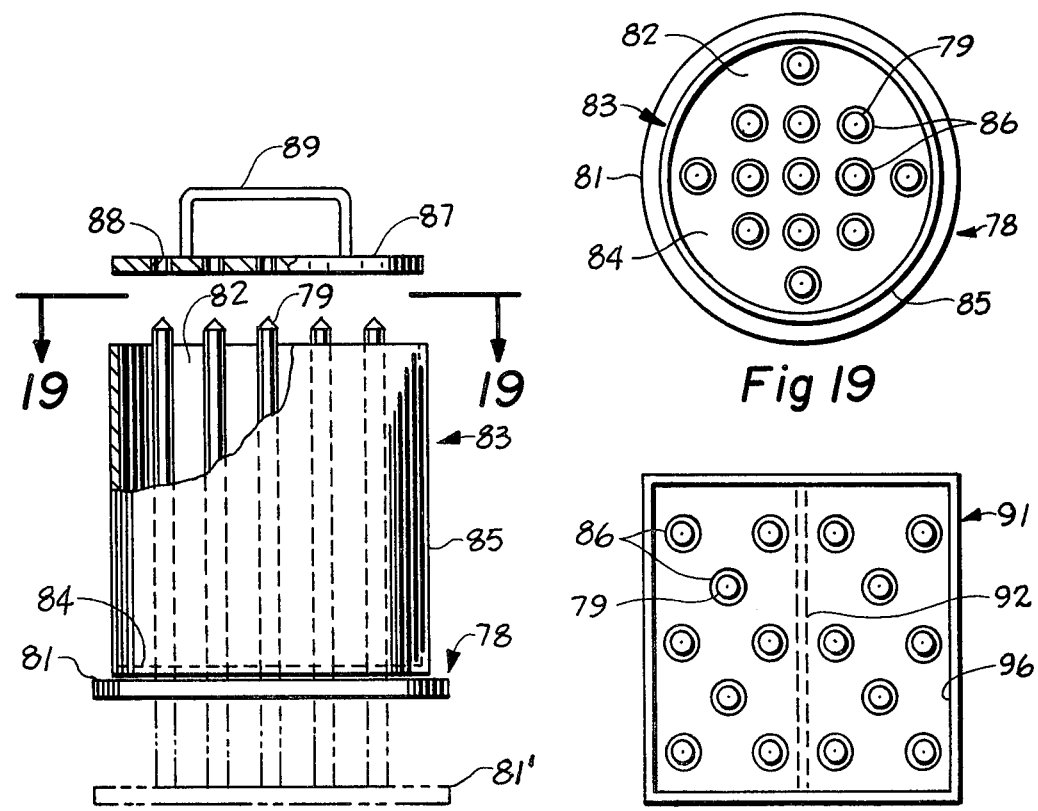
FIG. 18 is a side view of a mold assembly for preparing cheese topping according to a preferred embodiment of the subject invention.
FIG. 19 is a view taken on the line 19—19 in FIG. 18.
FIG. 20 is a view similar to FIG. 19 for preparing cheese topping according to a further preferred embodiment of the subject invention.

Further methods and equipment for making cheese topping useful in the practice of the subject invention, but also useful as intermediate products, will now be disclosed with the aid of FIGS. 18 et seq.

By way of background, the mold assemblies shown in FIGS. 18 to 30, 32 and 33 serve to make, from a solidifiable fluid mass of cheese 74 (see FIG. 26), pieces of cheese 75 having parallel elongate holes 76 (see FIG. 30). All these assemblies have first means generally designated by a reference numeral 78 and including a number of mutually spaced, parallel rods 79 for providing the elongate holes 76. In accordance with the illustrated preferred embodiments, the first means include a plate 81 for mounting the rods in mutually spaced, parallel relationship.

By way of example, the rod 79 and the plate 81 may be made of stainless steel or another material acceptable from a sanitary point of view.

For instance, the rods 79 and the plate 81 may be made of an acrylic plastic material.

The molds under consideration also have second means for providing a cavity for receiving the solidifiable fluid mass of cheese (see 74, FIG. 26) and for receiving the rods 79. The rods are removable from the cavity (see FIG. 29) to leave the elongate holes 76 (see FIG. 30) when the mass of cheese has solidified in the cavity.

Figure 24:
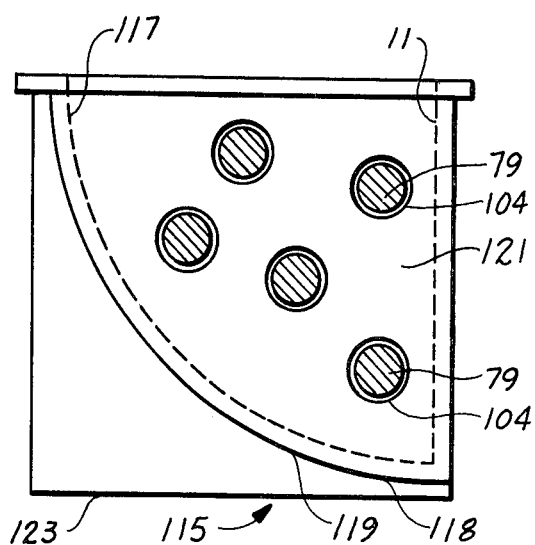
FIG. 24 is an elevation of a mold assembly for preparing cheese topping according to another preferred embodiment of the subject invention.
Figure 25:
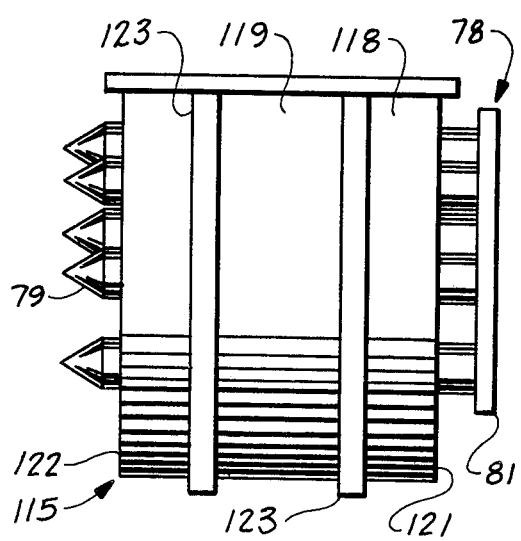
FIG. 25 is a side view of the mold assembly shown in FIG. 24.
Figure 23:
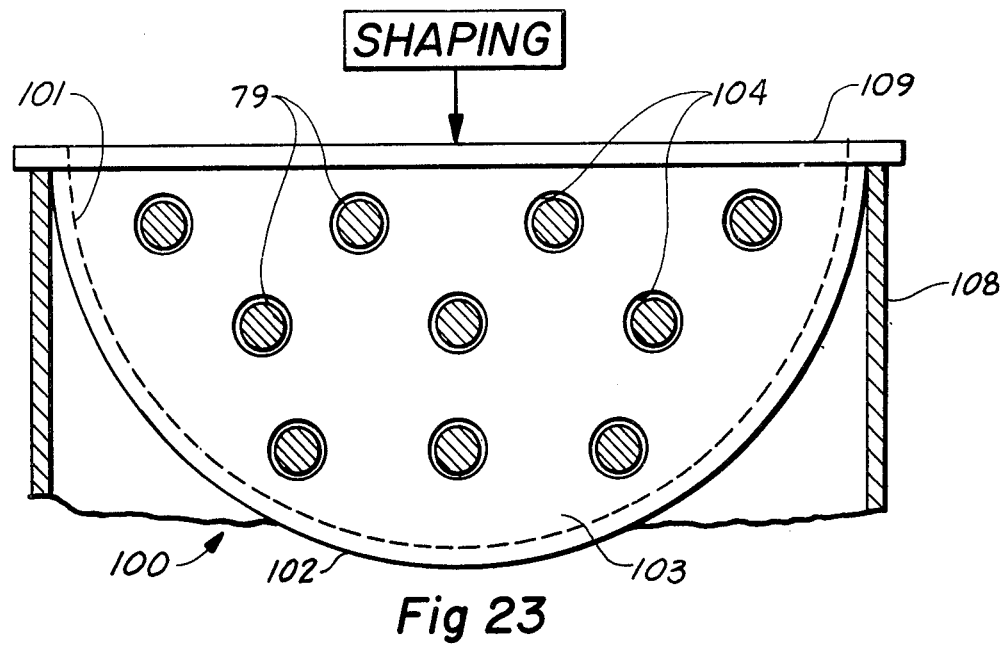
FIG. 23 is an elevation taken on the line 23—23 in FIG. 22.
Figure 22:
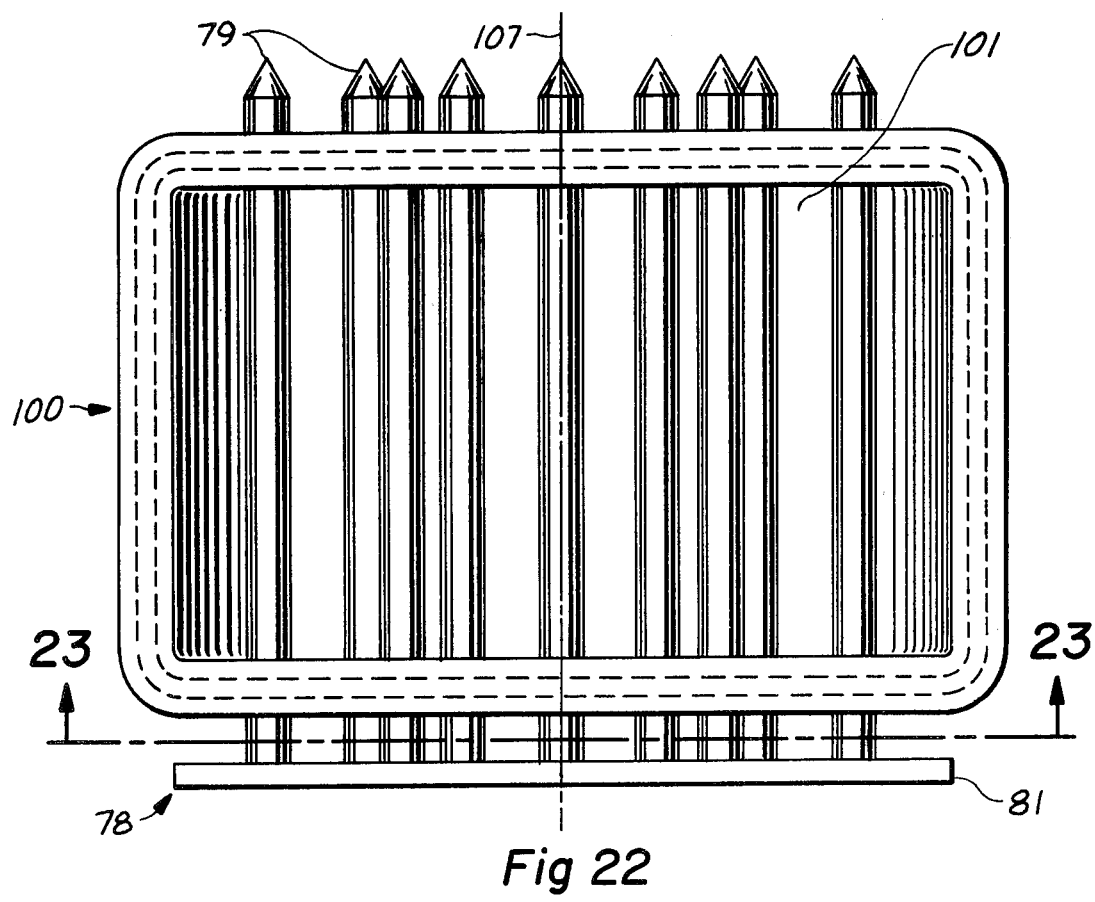
FIG. 22 is a top view of the mold assembly of FIG. 21 with a lid removed.

In FIGS. 18 and 19, the mold cavity is circular cylindrical. In FIG. 20, it is square or rectangular prismatic. In FIGS. 21 to 23, the mold cavity is semicircular. In FIGS. 24 and 25, on the other hand it is quarter round.

In the mold assembly of FIGS. 18 and 19, the cylindrical cavity 82 is formed or delimited by a mold 83 having a bottom 84 and a hollow-cylindrical wall portion 85 extending from the bottom 84. The wall portion 85 preferably is integral with the bottom 84.

The mold 83, as well as the other molds shown in FIGS. 20 to 30, 32 and 33 may be made of the same material as the rods 79. As seen in FIG. 19, the bottom 84 has apertures 86 for receiving the rods through that bottom. As indicated in FIG. 18 with the aid of dotted lines 81', the rods may be inserted through the bottom 84 into the cavity 82 and may subsequently be removed from that cavity when the poured mass of cheese (see 74, FIG. 26) has solidified in the mold. Upon removal from the cavity 82, the rods 79 leave the previously mentioned holes 76 in the cast piece of cheese 75 (see FIG. 30).

The block labeled "SHAPING" in FIG. 23 symbolizes for all the mold assemblies their making from the materials of which they are formed. For example, the molds may be thermoformed, drawn, molded, fabricated or otherwise formed or shaped as desired or expedient.

The assembly shown in FIG. 18 also includes a lid 87 for the mold 83. This lid may have apertures 88 for receiving projecting portions of the rods 79, and a handle 89 for manipulation of the lid 87 relative to the mold 83. In particular, the lid 83 may be moved down onto a fluid mass of cheese cast into the mold cavity 82. After the cast cheese mass has solidified in the mold, the lid 87 may be removed therefrom preparatory to the removal of the solidified mass of cheese.

In the illustrated preferred mold embodiments, the rods 79, when inserted into the mold or cavity through holes or apertures communicating with that cavity, extend in parallel to a longitudinal axis of the mold. In this respect, this longitudinal axis in the embodiment of FIGS. 18 and 19 may be the axis of symmetry of the cylindrical mold 83. In the other embodiments, the particular longitudinal axis is an axis extending in parallel to the curved part or surface of the mold.

FIG. 20 illustrates a modification of the mold assembly of FIGS. 18 and 19, wherein the mold is prismatic or square as shown at 91, rather than cylindrical as shown at 83.

The mold 91 is suitable for casting prismatic or parallelepiped pieces of cheese which have the requisite holes (see 76, FIG. 30) and from which square or rectangular apertured slices for topping square or rectangular pies may be cut. By way of example, an apertured square slice of topping cheese 10" has been shown in FIG. 4.

As indicated by a dotted double line 92, the mold of FIG. 20 may be modified for the casting of half pieces of cheese from which rectangular slices, such as the slices 93 and 94 shown in FIG. 16, may be cut. In this respect, the slices 93 and 94 shown in FIG. 16 may form a single layer cheese topping 95 when contiguously arranged on a square pizza pie.

By way of further alternative, the square mold of FIG. 20 may be dimensioned to cast pieces of cheese from which apertured quarter slices may be cut. Each set of these quarter slices may then form a single-layer cheese topping when contiguously arranged on a square pizza pie. In all these cases, the single layer of cheese extends into and along the peripheral or perimetric region of the pie shell.

The prismatic mold cavity 96 is in particular dimensioned so that the specific number of resulting slices (one, two, four) constituting the single cheese topping layer, will cover the food items completely except for the apertures 21 etc.

The mold assembly 100 shown in FIGS. 21 to 23 defines a mold cavity 101 having a semicircular cross-section for casting semicircular pieces of cheese from solidifiable fluid masses of cheese received in the mold cavity.

In particular, the assembly 100 includes a mold 102 having a semicircular cross-section for receiving the solidifiable fluid mass of cheese (see 74, FIG. 26). The mold 102 has a side wall 103 extending parallel to the semicircular cross-section of the mold and having apertures 104 for receiving the rods 79 through the side wall 103 and into the mold cavity 104. In the embodiment shown in FIGS. 21 to 23, the mold 102 has a pair of side walls 103 and 105 extending parallel to the semicircular cross-section of the mold and having the cavity 101 of the mold located therebetween. Registering apertures 104 are in this particular embodiment provided in both of the side walls 103 and 105, so that the rods 79 can extend through both side walls and throughout the mold cavity 101. In practice, this is, however, not absolutely necessary. For instance, only the side wall 103 could be provided with the apertures 104, in which case the rods 79 could be inserted through the side wall 103 into the cavity 101 and into close proximity to the second side wall 105. In practical application, this may leave a non-apertured remanant which would be removed during slicing of the cast piece of cheese.

In the embodiment shown in FIGS. 21 to 23, the rods 79 extend parallel to a longitudinal axis 107 of the mold cavity. The longitudinal axis in this respect, is a central axis extending in parallel to the semicircular surface of the mold 102 or, in other words, at right angles to the semicircular cross-section of the mold cavity 101.

The mold 102 may be supported during casting and solidification of the cheese mass in any desired manner, such as by a box-like support, part of which is seen at 108 in FIG. 23.

The mold 102 has a top rim portion or flange 109 which is integral with the remainder of the mold 102. As shown in FIG. 21, the flange 109 may cooperate with a top 110 to permit a closure of the mold during at least part of the solidification of the fluid cheese in the mold.

By way of example, the top 110 may be a flat plate of the same material as the mold 102 and may be releasably fastened to the flange 109, such as by clamps 112 and 113.

A quarter round mold assembly 115 is shown in FIGS. 24 and 25.

A quarter round mold assembly 115 serves to cast quarter round pieces of apertured cheese from which quarter round apertured slices of cheese 64, 65, 66 and 67 may be cut (see FIG. 17). As shown in FIG. 12, the quarter round apertured slices of cheese may be contiguously arranged in sets of four slices. Each set of four slices then forms a single layer of cheese topping on a pizza pie.

The quarter round mold assembly 115 of FIGS. 24 and 25 in effect is equivalent to one half of the semicircular mold assembly 100 to the left of the longitudinal axis 107 shown in FIG. 22. Accordingly, no special top view has been shown for the quarter round mold assembly 115, as its top view is closely similar to the one half of the top view of FIG. 22 to the left-hand side of the longitudinal axis 107.

The mold assembly 115 shown in FIGS. 24 and 25 defines a cavity 117 having a quarter round cross-section for receiving a solidifiable fluid mass of cheese and for receiving the rods 79 in parallel to a longitudinal axis of the cavity 117. This longitudinal axis or the rods 79, extend at right angles to the quarter round cross-section of the cavity 117.

The illustrated mold assembly 115 includes a mold 118 having a quarter round cross-section with a curved wall 119 and a straight wall 120, as well as side walls 121 and 122 for delimiting the quarter round cavity 117. The side walls 121 and 122 extend parallel to the quarter round cross-section of the mold 118 and have apertures 104 for receiving the rods 79. As in the case of the semicircular mold 102, the apertures 104 may be provided in only one of the side walls, such as the side wall 121, whereby the rods are still receivable through that side wall and into and through most of the mold cavity 117.

By way of optional modification, the mold 118 has been shown as provided with lateral ribs 123 serving as reinforcement and as support of the mold. The semicircular mold 102 may be provided with similar ribs, if desired.

The rods 79 are again removable from the mold 118 to leave the elongate holes (see 76, FIG. 30) when the mass of cheese has solidified in the cavity 117. Quarter round apertured slices of cheese 64 to 67 may then be cut from the solidified piece of cheese.

Use of the mold assembly 100 in making cheese topping will now be described with the aid of FIGS. 26 to 33. In this respect, while FIGS. 26 to 30, 32 and 33 show the mold assembly 100, it should be understood that the disclosed principles are equally applicable to the mold assemblies 83 and 115.

As shown at 74 and 125 in FIG. 26, a solidifiable fluid mass of pizza pie topping cheese is poured in its fluid state into the cavity (see 101 of FIG. 22) of the mold 102.

By way of example, the fluid mass of cheese may be the type of fluid cheese curd which occurs in cheese making processes after separation of the wey. As mentioned above, mozzarella, Parmesan, Muenster or jack cheeses or blends thereof may be used for making pizza pie cheese toppings. The mass in the cavity is provided with the rods 79 so as to provide for the holes 76 (see FIG. 30) which, in turn, result in the apertures 21, etc. in the cut slices of cheese.

According to the embodiment shown in FIG. 26, the fluid mass of cheese 74 is poured into the mold cavity and inbetween the rods 79 while these rods are present in the mold cavity to provide for the mentioned holes and apertures.

Alternatively, and as shown in FIG. 32, the fluid cheese mass 74 is poured into the mold cavity prior to insertion of the rods 79.

The embodiment of FIG. 26 may be preferably where the poured cheese mass has a consistency similar to a bread dough. On the other hand, if the consistency of the poured cheese is more in the nature of that of taffy, the method of FIG. 32 may be preferable. In that case, losses of cheese mass through the mold apertures 104 prior to insertion of the rods 79 may be negligible. However, if the uncovered apertures 104 present a problem in the pouring of the cheese according to FIG. 32, the mold 102 may be provided with removable side walls as indicated at 132 and 133 in FIG. 32. As further indicated by dotted line, these side walls, which temporarily cover the apertures 104, are removed prior to insertion of the rods 79 into the mold.

The actual insertion of the rods 79 into the mold 102 proceeds according to FIG. 33 which, in dotted outline at 79', shows the rods prior to their insertion into the mold through the apertures 104.

Accordingly, the modification shown in FIGS. 32 and 33 would first pour the fluid mass of cheese 74 into the mold while the rods 79 are removed therefrom and, as shown more specifically in FIG. 33, would then insert the rods 79 into the mold cavity to provide for the holes 76 or apertures 21 after the mass of cheese has been poured into the mold cavity. As shown in the drawings, the tips of the rods 79 are pointed to facilitate insertion of the rods into the mold and through the poured mass of cheese.

After the fluid mass of cheese has been poured according to FIG. 26 or according to FIGS. 32 and 33, the mold 102 with inserted rods 79 and poured cheese content is advanced to a cold water bath 135. Prior to immersion of the filled mold assembly 100 into the cold water bath, the mold is closed by the top or lid 110.

The cold water bath 135 promotes setting for solidification of the poured cheese in the mold. Typically, the filled mold remains immersed in the water bath for about an hour. In this request, the fluid cheese mass 74 may be poured from the reservoir 125 while in a heated state, and may then be cooled to or below room temperature in the water bath 135.

The mold assembly is then removed from the water bath 135 shown in FIG. 27 and is transferred to a curing or aging bath 137 shown in FIG. 28. The lid 110 may be removed from the mold assembly prior to the immersion of that assembly into the curing bath 137 so as to permit better access of the curing solution to the cheese content of the mold. The rods 79 are, however, left in the mold assembly as shown in FIG. 28 to prevent collapsing or obliteration of the holes in the poured cheese mass. The aging solution may, however, penetrate the cheese content of the mold between the rods and wall portions of the apertures 104 to promote curing of the cheese mass at, and fortification of, the holes 76. By way of example, the curing solution may be brine which, in the case of a semicircular mold may act in the bath 137 on the cheese content of the mold 102 for about twelve hours at room temperature.

This by way of example and not by way of limitation.

After removal of the mold assembly 100 from the curing bath 137 the rods 79 are withdrawn from the mold 102 and from the solidified mass of cheese contained therein, as partially shown in FIG. 29. The rods 79 thereby leave in the solidified cheese mass a number of elongate holes 76 corresponding to the rods 79.

As shown in FIG. 30, the mold 102 may then be inverted and the solidified piece of cheese permitted to leave the mold 102 under its own weight. Air entering the mold apertures 104 as shown by arrows 139 thereby break any vacuum that might otherwise occur in the mold when the cheese contents 75 move downwardly as indicated by the arrow 141 in FIG. 30. The mold is then reusable for a further casting process.

The solidified piece of cheese 75, on the other hand, is advanced to a slicer 42 which cuts the apertured slices of cheese therefrom. These slices are either circular as shown at 10 in FIG. 1, if the piece of cheese has been prepared in a cylindrical mold 83. On the other hand, the slices will be quarter round as shown at 64 to 67 in FIG. 17, if the type of mold shown in FIGS. 24 and 25 is used. Similarly, the slices will be semicircular as shown at 71 and 72 in FIG. 13, if the semicircular mold shown in FIGS. 21 to 23 is employed for making the piece of cheese 75. The slicer 42 diagrammatically shown in FIG. 31 may be a food slicer which, for instance, has an oscillating guillotine blade or a rotating circular knife.

The apertured cut slices of cheese may be presented to the operator on a conveyor belt 143.

Prior to the application of the apertured slices to pizza or other pies, these slices may be stored, packaged and shipped as desired.

In the case of semicircular slices, the apertured slices 71 and 72 may be identical and may be cut from the same slice of cheese 75. Similarly, in the case of quarter round slices, the apertured slices 64 to 67 may be identical and cut from the same piece of apertured cheese. As to each cheese topping layer, the slicer 42 cuts from the solidified mass of cheese 75 as many slices of pizza pie topping cheese as necessary for providing that cheese topping in the form of a layer of pizza pie topping cheese having the above mentioned apertures through which vapor and juice can rise from the food items including the sauce 15.

From the commercial and practical point of view, the semicircular cheese slice version herein disclosed presents an optimized solution. In particular, the curng process is shortened if the poured cheese mass is in a semicircular form, thereby improving the utilization factor of the mold over versions in which a cylindrical piece of cheese is cast. Also, the semicircular version has been found to be easier to slice, to be simpler and more convenient to package and to be easier to apply to the pizza pie as its single-layer cheese topping.

The subject extensive disclosure will suggest or render apparent various modifications and variations within the spirit and scope of the subject invention to those skilled in the art. All of these modifications and variations are intended to be covered within the scope of the appendant claims.

I claim:

1. In a method of making a pizza pie of the type having a pie shell including a peripheral region, food items covering said pie shell up to said peripheral region and including a sauce emitting vapor and juice upon heating, and a cheese topping on said food items, the improvement comprising in combination the steps of:

providing up to four geometrically congruent slices of pizza pie topping cheese, including dimensioning of said slices to extend from the center of the pie into said peripheral region and to extend along a portion of said peripheral region corresponding to the length of said peripheral region divided by the number of said up to four slices, further dimensioning said slices jointly to cover said food items and extend along and into said peripheral region in one layer composed of said slices when contiguously arranged on said food items, and providing each of said slices with several apertures through which vapor and juice can rise from said food items including said sauce;

contiguously arranging said apertured slices on said food items to form said one layer covering said food items and extending into said peripheral region;

retaining said food items including said sauce on said pie shell with the weight of said contiguously arranged apertured slices against lateral forces of inertia occurring during handling of the pie prior to heating; and subjecting said pie shell, contiguously arranged apertured slices of cheese and covered food items including said sauce, to heat and causing vapor and juice from said covered food items including said sauce to rise through apertures in said slices of cheese and said slices of cheese to soften into partial conformity with said food items on said pie shell.

2. A method as claimed in claim 1, wherein:
said apertures are uniformly distributed throughout each slice of cheese.

3. A method as claimed in claim 1, wherein:
said apertures are provided with individual widths of from one-quarter inch to one-half inch.

4. A method as claimed in claim 1, wherein:
said apertures are provided with individual widths of from one-quarter inch to one-half inch and are mutually spaced by distances of from one-quarter inch to one inch.

5. A method as claimed in claim 1, wherein:
said apertures are provided with individual widths of from one-quarter inch to one-half inch, are mutually spaced by distances of from one-quarter inch to one inch, and are uniformly distributed throughout said slices of cheese.

6. A method as claimed in claim 1, wherein:
said apertures are provided by punching holes into slices of cheese.

7. A method as claimed in claim 1, wherein:
said apertures are provided by punching holes into a piece of pizza pie topping cheese; and
said slices are cut from said piece of cheese having said holes.

8. A method as claimed in claim 1, including the steps of:
providing a cheese mold;
providing dowels in said cheese mold for providing said apertures;
casting a piece of cheese in said mold having said apertures provided by said dowels;
removing said piece of cheese having said apertures from said mold; and cutting said slices from said piece of cheese having said apertures.

9. A pizza pie made by a method as claimed in claim 1.

10. In a method of making a pizza pie of the type having a pie shell including a circular peripheral region, food items covering said pie shell up to said circular peripheral region and including a sauce emitting vapor and juice upon heating, and a cheese topping on said food items, the improvement comprising in combination the steps of:
providing two semicircular slices of pizza pie topping cheese, including dimensioning said two semicircular slices jointly to cover said food items and extend along and into said circular peripheral region in one layer composed of said two slices when contiguously arranged on said food items, and providing each of said slices with several apertures through which vapor and juice can rise from said food items including said sauce;
contiguously arranging said apertured slices on said food items to form said one layer covering said food items and extending into said peripheral region;
retaining said food items including said sauce on said pie shell with the weight of said contiguously arranged apertured slices against lateral forces of inertia occurring during handling of the pie prior to heating; and
subjecting said pie shell, contiguously arranged apertured slices of cheese and covered food items including said sauce, to heat and causing vapor and juice from said covered food items including said sauce to rise through apertures in said slices of cheese and said slices of cheese to soften into partial conformity with said food items on said pie shell.

11. A method as claimed in claim 10, wherein:
said apertures are uniformly distributed throughout each slice of cheese.

12. A method as claimed in claim 10, wherein:
said apertures are provided with individual widths of from one-quarter inch to one-half inch.

13. A method as claimed in claim 10, wherein:
said apertures are provided with individual widths of from one-quarter inch to one-half inch and are mutually spaced by distances of from one-quarter inch to one inch.

14. A method as claimed in claim 10, wherein:
said apertures are provided with individual widths of from one-quarter inch to one-half inch, are mutually spaced by distances of from one-quarter inch to one inch, and are uniformly distributed throughout said slices of cheese.

15. A method as claimed in claim 10, wherein:
said apertures are provided by punching holes into slices of cheese.

16. A method as claimed in claim 1, wherein:
said apertures are provided by punching holes into a piece of pizza pie topping cheese; and
said slices are cut from said piece of cheese having said holes.

17. A method as claimed in claim 10, including the steps of:
providing a cheese mold;
providing dowels in said cheese mold for providing said apertures;
casting a piece of cheese in said mold having said apertures provided by said dowels;
removing said piece of cheese having said apertures from said mold; and
cutting said slices from said piece of cheese having said apertures.

18. A pizza pie made by a method as claimed in claim 10.

19. In a method of making a pizza pie of the type having a pie shell including a peripheral region, food items covering said pie shell up to said peripheral region and including a sauce emitting vapor and juice upon heating, and a cheese topping on said food items, the improvement comprising in combination the steps of:
providing an integral slice of pizza pie topping cheese, including dimensioning said integral slice to cover said food items and extend along and into said peripheral region in one piece when arranged on said food items, and providing said integral slice with several apertures through which vapor and juice can rise from said food items including said sauce;
arranging said integral slice on said food items to cover said food items and extend into said peripheral region in one piece;
retaining said food items including said sauce on said pie shell with the weight of said integral slice against lateral forces of inertia occurring during handling of the pie prior to heating; and
subjecting said pie shell, apertured integral slice of cheese and covered food items including said sauce, to heat and causing vapor and juice from said covered food items to rise through apertures in said integral slice of cheese and said integral slice of cheese to soften into partial conformity with said placed food items on said pie shell.

20. A method as claimed in claim 19, wherein:
said apertures are uniformly distributed throughout said slice of cheese.

21. A method as claimed in claim 19, wherein:
said apertures are provided with individual widths of from one-quarter inch to one-half inch.

22. A method as claimed in claim 19, wherein:
said apertures are provided with individual widths of from one-quarter inch to one-half inch and are mutually spaced by distances of from one-quarter inch to one inch.

23. A method as claimed in claim 19, wherein:
said apertures are provided with individual widths of from one-quarter inch to one-half inch, are mutually spaced by distances of from one-quarter inch to one inch, and are uniformly distributed throughout said slice of cheese.

24. A method as claimed in claim 19, wherein:
said apertures are provided by punching holes into a slice of cheese.

25. A method as claimed in claim 19, wherein:
said apertures are provided by punching holes into a piece of pizza pie topping cheese; and
said slice is cut from said piece of cheese having said holes.

26. A method as claimed in claim 19, including the steps of:
providing a cheese mold;
providing dowels in said cheese mold for providing said apertures;
casting a piece of cheese in said mold having said apertures provided by said dowels;

removing said piece of cheese having said apertures from said mold; and cutting said slice from said piece of cheese having said apertures.

27. A pizza pie made by a method as claimed in claim 19.

28. A method of making a cheese topping for a pizza pie of the type having a pie shell including a peripheral region, food items covering said pie shell up to said peripheral region and including a sauce emitting vapor and juice upon heating, and the cheese topping on said food items, comprising in combination the steps of:

providing for each cheese topping up to four geometrically congruent slices of pizza pie topping cheese, including dimensioning each of said slices to extend from the center of the pie into said peripheral region and to extend along a portion of said peripheral region corresponding to the length of said peripheral region divided by the number of said up to four slices, further dimensioning said slices jointly to cover said food items and extend along and into said peripheral region in one layer composed of said slices when contiguously arranged on said food items, and providing each of said slices with several apertures through which vapor and juice can rise from said food items including said sauce.

29. A method as claimed in claim 28, wherein:
said apertures are uniformly distributed throughout each slice of cheese.

30. A method as claimed in claim 28, wherein:
said apertures are provided with individual widths of from one-quarter inch to one-half inch.

31. A method as claimed in claim 28, wherein:
said apertures are provided with individual widths of from one-quarter inch to one-half inch and are mutually spaced by distances of from one-quarter inch to one inch.

32. A method as claimed in claim 28, wherein:
said apertures are provided with individual widths of from one-quarter inch to one-half inch, are mutually spaced by distances of from one-quarter inch to one inch, and are uniformly distributed throughout said slices of cheese.

33. A method as claimed in claim 28, wherein:
said apertures are provided by punching holes into slices of cheese.

34. A method as claimed in claim 28, wherein:
said apertures are provided by punching holes into a piece of pizza pie topping cheese; and
said slices are cut from said piece having said holes.

35. A method as claimed in claim 28, including the steps of:
providing a cheese mold;
providing dowels in said cheese mold for providing said apertures;
casting a piece of cheese in said mold having said apertures provided by said dowels;
removing said piece of cheese having said apertures from said mold; and
cutting said slices from said piece of cheese having said apertures.

36. A method of making a cheese topping for a pizza pie of the type having a pie shell including a circular peripheral region, food items covering said pie shell up to said circular peripheral region and including a sauce emitting vapor and juice upon heating, and the cheese topping on said food items, comprising in combination the steps of:

providing two semicircular slices of pizza pie topping cheese, including dimensioning said two semicircular slices jointly to cover said food items and extend along and into said circular peripheral region in one layer composed of said two slices when contiguously arranged on said food items, and providing each of said slices with several apertures through which vapor and juice can rise from said food items including said sauce.

37. A method as claimed in claim 36, wherein:
said apertures are uniformly distributed throughout each slice of cheese.

38. A method as claimed in claim 36, wherein:
said apertures are provided with individual widths of from one-quarter inch to one-half inch.

39. A method as claimed in claim 36, wherein:
said apertures are provided with individual widths of from one-quarter inch to one-half inch and are mutually spaced by distances of from one-quarter inch to one inch.

40. A method as claimed in claim 36, wherein:
said apertures are provided with individual widths of from one-quarter inch to one-half inch, are mutually spaced by distances of from one-quarter inch to one inch, and are uniformly distributed throughout said slices of cheese.

41. A method as claimed in claim 36, wherein:
said apertures are provided by punching holes into slices of cheese.

42. A method as claimed in claim 36, wherein:
said apertures are provided by punching holes into a piece of pizza pie topping cheese; and
said slices are cut from said piece having said holes.

43. A method as claimed in claim 36, including the steps of:
providing a cheese mold;
providing dowels in said cheese mold for providing said apertures;
casting a piece of cheese in said mold having said apertures provided by said dowels;
removing said piece of cheese having said apertures from said mold; and
cutting said slices from said piece of cheese having said apertures.

44. A method of making a cheese topping for a pizza pie of the type having a pie shell including a peripheral region, food items covering said pie shell up to said peripheral region and including a sauce emitting vapor and juice upon heating, and the cheese topping on said food items, comprising in combination the steps of:

providing an integral slice of pizza pie topping cheese, including dimensioning said integral slice to cover said food items and extend along and into said peripheral region in one piece when arranged on said food items, and providing said integral slice with several apertures through which vapor and juice can rise from said food items including said sauce.

45. A method as claimed in claim 44, wherein:
said apertures are uniformly distributed throughout said slice of cheese.

46. A method as claimed in claim 44, wherein:
said apertures are provided with individual widths of from one-quarter inch to one-half inch.

47. A method as claimed in claim 44, wherein:

said apertures are provided with individual widths of from one-quarter inch to one-half inch and are mutually spaced by distances of from one-quarter inch to one inch.

48. A method as claimed in claim 44, wherein:
said apertures are provided with individual widths of from one-quarter inch to one-half inch, are mutually spaced by distances of from one-quarter inch to one inch, and are uniformly distributed throughout said slice of cheese.

49. A method as claimed in claim 44, wherein:
said apertures are provided by punching holes into a slice of cheese.

50. A method as claimed in claim 44, wherein:
said apertures are provided by punching holes into a piece of pizza pie topping cheese; and
said slice is cut from said piece having said holes.

51. A method as claimed in claim 44, including the steps of:
providing a cheese mold;
providing dowels in said cheese mold for providing said apertures;
casting a piece of cheese in said mold having said apertures provided by said dowels;
removing said piece of cheese having said apertures from said mold; and
cutting said slice from said piece of cheese having said apertures.

52. An article of manufacture, comprising in combination:
a pie shell having a peripheral region;
food items covering said pie shell up to said peripheral region and including a sauce emitting vapor and juice upon heating; and
a cheese topping on said food items, comprising up to four geometrically congruent slices of pizza pie topping cheese contiguously arranged on, and jointly covering, said food items in one layer composed of said slices and extending along and into said peripheral region; and
each of said slices having several apertures fpr releasing vapor and juice from said food items including said sauce.

53. An article of manufacture as claimed in claim 52, wherein:
said apertures are uniformly distributed throughout each slice of cheese.

54. An article of manufacture as claimed in claim 52, wherein:
said apertures having individual widths of from one-quarter inch to one-half inch.

55. An article of manufacture as claimed in claim 52, wherein:
said apertures have individual widths of from one-quarter inch to one-half inch and are mutually spaced by distances of from one-quarter inch to one inch.

56. An article of manufacture, comprising in combination:
a pie shell having a circular peripheral region;
food items covering said pie shell up to said circular peripheral region and including a sauce emitting vapor and juice upon heating; and
a cheese topping on said food items, comprising two semicircular slices of pizza pie topping cheese contiguously arranged on, and jointly covering, said food items in one layer composed of said two slices and extending along and into said circular peripheral region;
each of said slices having several apertures for releasing vapor and juice from said food items including said sauce.

57. An article of manufacture as claimed in claim 56, wherein:
said apertures are uniformly distributed throughout each slice of cheese.

58. An article of manufacture as claimed in claim 56, wherein:
said apertures have individual widths of from one-quarter inch to one-half inch.

59. An article of manufacture as claimed in claim 56, wherein:
said apertures have individual widths of from one-quarter inch to one-half inch and are mutually spaced by distances of from one-quarter inch to one inch.

60. An article of manufacture, comprising in combination:
a pie shell having a peripheral region;
food items covering said pie shell up to said peripheral region and including a sauce emitting vapor and juice upon heating; and
a cheese topping on said food items, comprising an integral slice of pizza pie topping cheese arranged on, and covering, said food items in one piece extending along and into said peripheral region;
said integral slice having several apertures for releasing vapor and juice from said food items including said sauce.

61. An article of manufacture as claimed in claim 60, wherein:
said apertures are uniformly distributed throughout said slice of cheese.

62. An article of manufacture as claimed in claim 60, herein:
said apertures have individual widths of from one-quarter inch to one-half inch.

63. An article of manufacture as claimed in claim 60, wherein:
said apertures have individual widths of from one-quarter inch to one-half inch and are mutually spaced by distances of from one-quarter inch to one inch.

64. An article of manufacture for application to and for covering a pie shell having a peripheral region, and food items arranged on said pie shell up to said peripheral region and including a sauce emitting vapor and juice upon heating, comprising:
a cheese topping for said food items, comprising for each topping up to four geometrically congruent slices of pizza pie topping cheese dimensioned jointly to cover said food items and extend along and into said peripheral region in one layer composed of said slices when contiguously arranged on said food items;
each of said slices being further dimensioned to extend from the center of the food items on the pie shell into said peripheral region and to extend along a portion of said peripheral region corresponding to the length of said peripheral region divided by the numer of said up to four slices; and
each of said slices having several apertures for releasing vapor and juice from said food items including said sauce.

65. An article of manufacture as claimed in claim 64, wherein:
said apertures are uniformly distributed throughout each slice of cheese.

66. An article of manufacture as claimed in claim 64, wherein:
said apertures have individual widths of from one-quarter inch to one-half inch.

67. An article of manufacture as claimed in claim 64, wherein:
said apertures have individual widths of from one-quarter inch to one-half inch and are mutually spaced by distances of from one-quarter inch to one inch.

68. An article of manufacture for application to and for covering a pie shell having a circular peripheral region and food items arranged on said pie shell up to said peripheral region and including a sauce emitting vapor and juice upon heating, comprising:
a cheese topping for said food items, comprising two semicircular slices of pizza pie topping cheese dimensioned jointly to cover said food items in one layer composed of said two slices and extending along and into said circular peripheral region when said two slices are contiguously arranged on said food items;
each of said slices having several apertures for releasing vapor and juice from said food items including said sauce.

69. An article of manufacture as claimed in claim 68, wherein:
said apertures are uniformly distributed throughout each slice of cheese.

70. An article of manufacture as claimed in claim 68, wherein:
said apertures have individual widths of from one-quarter inch to one-half inch.

71. An article of manufacture as claimed in claim 68, wherein:
said apertures have individual widths of from one-quarter inch to one-half inch and are mutually spaced by distances of from one-quarter inch to one inch.

72. An article of manufacture for application to and for covering a pie shell having a peripheral region, and food items arranged on said pie shell up to said peripheral region and including a sauce emitting vapor and juice upon heating, comprising:
a cheese topping for said food items, comprising an integral slice of pizza pie topping cheese dimensioned to cover said food items in one piece extending along and into said peripheral region when arranged on said food items;
said integral slice having several apertures for releasing vapor and juice from said food items including said sauce.

73. An article of manufacture as claimed in claim 72, wherein:
said apertures are uniformly distributed throughout said slice of cheese.

74. An article of manufacture as claimed in claim 72, wherein:
said apertures have individual widths of from one-quarter inch to one-half inch.

75. An article of manufacture as claimed in claim 72, wherein:
said apertures have individual widths of from one-quarter inch to one-half inch and are mutually spaced by distances of from one-quarter inch to one inch.

* * * * *